(12) United States Patent
Paranjpe et al.

(10) Patent No.: US 7,359,311 B1
(45) Date of Patent: Apr. 15, 2008

(54) DECODING METHOD AND APPARATUS USING CHANNEL STATE INFORMATION FOR USE IN A WIRELESS NETWORK RECEIVER

(75) Inventors: Milind D. Paranjpe, Mountain View, CA (US); Brian Hart, Wollstonecraft (AU); David J. Pignatelli, Saratoga, CA (US); Ender Ayanoglu, Irvine, CA (US); Eldad Perahia, Sunnyvale, CA (US); Philip J. Ryan, Stanmore (AU); Bretton Lee Douglas, San Jose, CA (US); Uri Parker, Kibbutz Shaar Hagolan (IL)

(73) Assignee: Cisco Technology, Inc., San Jose, CA (US)

( * ) Notice: Subject to any disclaimer, the term of this patent is extended or adjusted under 35 U.S.C. 154(b) by 1066 days.

(21) Appl. No.: 10/418,694

(22) Filed: Apr. 18, 2003

(51) Int. Cl.
*H04J 11/00* (2006.01)

(52) U.S. Cl. .................. 370/203; 370/329; 375/340; 375/260; 375/346; 375/341; 375/316

(58) Field of Classification Search ........... 370/203, 370/208, 329, 330, 338; 375/316, 340, 260, 375/346
See application file for complete search history.

(56) References Cited

U.S. PATENT DOCUMENTS

| | | | | |
|---|---|---|---|---|
| 5,289,504 | A * | 2/1994 | Wilson et al. .............. | 375/316 |
| 5,467,132 | A | 11/1995 | Fazel et al. ................. | 348/390 |
| 6,137,847 | A | 10/2000 | Stott et al. ................. | 375/344 |
| 6,317,470 | B1 | 11/2001 | Kroeger et al. ............ | 375/340 |
| 6,320,627 | B1 | 11/2001 | Scott et al. ................. | 348/726 |
| 6,359,938 | B1 | 3/2002 | Keevill et al. .............. | 375/316 |
| 6,442,130 | B1 | 8/2002 | Jones, IV et al. .......... | 370/208 |
| 6,452,981 | B1 | 9/2002 | Raleigh et al. ............. | 375/299 |
| 6,487,253 | B1 | 11/2002 | Jones, IV et al. .......... | 375/260 |
| 6,499,128 | B1 | 12/2002 | Gerlach et al. ............. | 714/755 |
| 7,058,002 | B1 * | 6/2006 | Kumagai et al. ........... | 370/203 |
| 7,133,473 | B1 * | 11/2006 | Lou et al. ................... | 375/341 |
| 2002/0037057 | A1 | 3/2002 | Kroeger et al. ............ | 375/329 |

(Continued)

FOREIGN PATENT DOCUMENTS

EP 0991239 A2 5/2000

OTHER PUBLICATIONS

J. Heiskala and J. Terry, Ph.D., "OFDM Wireless LANs: A Theoretical Practical Guide", Sams Publishing, ISBN: 0672321572, 2002, pp. 113, 116.

(Continued)

*Primary Examiner*—Ricky Q. Ngo
*Assistant Examiner*—Kibrom T Hailu
(74) *Attorney, Agent, or Firm*—Dov Rosenfeld; Inventek

(57) ABSTRACT

A method, apparatus, and carrier medium for determining channel state information (CSI) in an OFDM radio receiver. The receiver is for receiving packets of OFDM data as a result of OFDM data being transmitted. The method includes forming an estimate of the channels of the subcarriers for received OFDM data to provide frequency responses of the channels of the subcarriers, and forming a measure of quality ("channel state information," "CSI") for the channels of the subcarriers based on the relative strength of the frequency responses. The forming of the CSI does not require estimating the relative amount of noise or interference in each channel. The formed CSI is used in demodulating and decoding received OFDM data.

43 Claims, 7 Drawing Sheets

U.S. PATENT DOCUMENTS

| | | |
|---|---|---|
| 2002/0131516 A1 | 9/2002 | El Gamal et al. ............ 375/285 |
| 2002/0177427 A1 | 11/2002 | Nadgauda et al. .......... 455/403 |
| 2002/0186797 A1 | 12/2002 | Robinson .................... 375/341 |
| 2004/0151145 A1* | 8/2004 | Hammerschmidt ......... 370/338 |

OTHER PUBLICATIONS

J.H. Stott, "Explaining some of the magic of COFDM", from the *Proceedings of 20th International Television Symposium 1997*, Montreux, Switzerland, Jun. 13-17, 1997.

J.H. Stott, "The how and why of COFDM" (Tutorial-COFDM), *EBU Technical Review*, Winter 1998, BBC Research and Development.

"Reduced Complexity Equalizers for Zero-Padded OFDM Transmissions", B. Muquet, M. de Courville, G. B. Giannakis, Z. Wang, P. Duhamel Intl. Conf. on Acoustics, Speech and Signal Processing—Jun. 2000—Istanbul, Turkey.

H. Schmidt, V. Kühn, K.D. Kammeyer, R. Rückriem, and S. Fechtel: "Channel Tracking in Wireless OFDM Systems," SCI 2001, Orlando. Florida, USA, Jul. 22-25, 2001.

K.-K. Wong, R. S.-K. Cheng, K.B. Letaief, R.D. Murch, "Adaptive Antennas at the Mobile and Base Stations in an OFDM/TDMA System", *IEEE Transactions on Communications*, vol. 49, No. 1, Jan. 2001.

T. F. Wong, D. J. Skellern and L. H. C. Lee, "An automatic procedure to construct the optimal soft-decision quantizers and branch metrics for Viterbi decoders," in Proceedings of the 3rd URSI International Symposium on Signals, Systems and Electronics (ISSSE '95), pp. 423-426, San Francisco, CA, Oct. 1995.

Barhumi I. & Moonen.: "Pilot tone based channel estimation for OFDM systems with transmitter diversity in mobile wireless channels", in Proc. of the program for research on integrated systems and circuits (ProRISC), Veldhoven, The Netherlands, Nov. 2001, pp. 270-275.

* cited by examiner

DECODING METHOD AND APPARATUS USING CHANNEL STATE INFORMATION FOR USE IN A WIRELESS NETWORK RECEIVER

BACKGROUND

This invention is related to wireless networks, and in particular to a method and apparatus to incorporate channel state information (CSI) in demodulating and decoding a received signal in an orthogonal frequency division multiplexing (OFDM) radio receiver.

Wireless local area network (WLAN) standards that use OFDM have recently become popular. Such standards include variants of the IEEE 802.11 standard such as IEEE 802.11a in the 5 GHz frequency range and 802.11g in the 2.4 GHz frequency range. In an OFDM radio transmitter, a signal for transmission is split into a set of subcarriers (also called "tones") that are each modulated then combined and transmitted wirelessly via a wireless channel. At the receiving end, the received signal is split into the various subcarriers that are then demodulated and decoded to produce the received signal. An OFDM transmitter typically uses the inverse discrete Fourier transform (IDFT), typically implemented as an inverse Fast Fourier Transform (IFFT), to combine the subcarriers for transmission, and an OFDM receiver typically uses the forward discrete Fourier transform (DFT), typically implemented as a Fast Fourier Transform (FFT) to form the received subcarriers from the received signal. Each of the subcarriers experiences a different channel.

OFDM transmitters typically use forward error correction and/or convolutional coding, and thus are tolerant of noise present in each of the subcarriers. In the presence of Rayleigh fading, the channels for some of the subcarriers may have a lower amplitude response than others. In some cases, some of the subcarriers may have a response so low that their signal-to-noise ratios are extremely low. Thus, in OFDM, the various subcarriers will have different signal-to-noise ratios (SNRs) as a result of the different quality of the respective channels. For example, a subcarrier that falls into a notch in the frequency response will include mostly noise; one in a peak will suffer much less from noise. Thus, data items conveyed by subcarriers that pass through a relatively high quality channel and thus have a relatively high SNR are a priori more reliable than those conveyed by subcarriers that pass through relatively low quality channels and thus have low SNRs. This extra a priori information is usually known as channel-state information (CSI). The channel-state information concept similarly embraces interference which can affect carriers selectively, just as noise does.

When knowledge about the reliability of each of the channels of the subcarriers is used in the decoding process, e.g., when unreliable subcarriers are trusted less, the packet error rate performance improves significantly in the presence of fading.

Including channel-state information in decoding, e.g., in the generation of soft decisions is known in the art. See for example, J. H. Stott: "Explaining some of the magic of COFDM," Proceedings of 20th International Television Symposium 1997, Montreux, Switzerland, in which it is stated:

> "Including channel-state information in the generation of soft decisions is the key to the unique performance of COFDM in the presence of frequency-selective fading and interference."

See also J. H. Stott: "The How and Why of COFDM," European Broadcast Union (EBU) Technical Review, Winter, 1998. COFDM stands for coded OFDM.

The present invention is related to using channel state information in a practical receiver for use in a WLAN that uses OFDM.

It is known to detect "null" channels using the estimated channel response and not use the subcarriers of the null channels.

In a typical OFDM WLAN transmitter, to protect the data from the channel, the packet data is channel encoded with a convolutional code and modulated onto the subcarriers. In a typical OFDM WLAN receiver, a FFT processor determines the individual subcarriers. A channel estimator and equalizer equalizes the subcarrier for their different respective channels, and a demodulator demodulates the equalized subcarrier signals. The demodulator forms soft decisions rather than hard decisions. The soft decision data is passed to a decoder, e.g., a Viterbi decoder.

When CSI is incorporated, the soft decision data is weighted based on channel metrics so that data from subcarriers of relatively poor quality, e.g., of relatively poor quality channels will have less of an impact on the decoding process of the Viterbi decoder.

U.S. Pat. No. 6,442,130 titled SYSTEM FOR INTERFERENCE CANCELLATION to inventors Jones, et al., and assigned to the assignee of the present invention, describes one prior art system that uses CSI. U.S. Pat. No. 6,442,130 is incorporated herein by reference. While the prior art receiver described in U.S. Pat. No. 6,442,130 uses multiple antennas and spatial processing, the channel state information aspects are applicable to a receiver with a single antenna, not just to one that includes spatial processing. The CSI aspects of the receiver described in U.S. Pat. No. 6,442,130 ("the '130 receiver") will therefore be used to illustrate a typical prior art receiver that uses CSI.

The '130 receiver includes a FFT processor that determines each subcarrier, a channel estimator that determines the channel response for each of the subcarriers, and a demodulator (called a symbol estimation block) to determine the symbol for each subcarrier. A noise and interference estimation block estimates the noise and interference at each subcarrier's channel and includes the demodulator. The noise and interference estimation block determines a measure of the difference between the equalized received signal and the nearest constellation point for the modulation scheme used to modulate the signal.

The multiple antenna version of the '130 receiver includes a statistical characterization block that develops a statistical characterization of the interference and noise among the antennas. This block is not needed in the single antenna case of the '130 receiver. In that case, the noise and interference estimation block is followed by a cost metric processor that generates the soft decisions as well as a cost metric value for each soft decision for each subcarrier. The cost metric value is a measure of the signal to noise ratio of the subcarrier signal of the channel. The cost metric value is used by a Viterbi decoder to decode the subcarrier signal. Thus, this cost value metric is the CSI. A simplified embodiment weights soft decisions by the CSI measure and inputs the weighted soft decisions to a Viterbi decoder that uses conventional Viterbi decoder metrics.

The determination of the CSI used in the '130 receiver is relatively complex requiring an estimate of the signal-to-interference-and-noise-ratio (SINR), which in turn required an estimate of the signal power and an estimate of the noise and/or interference power. Determining noise power is a computationally intense process. U.S. Pat. No. 6,442,130 obtains a measure of the noise power obtaining a measure of the distance in the I-Q plane between a signal and its nearest decision point. This quality of this measure of noise decreases the lower the signal-to-noise ratio because the lower the signal-to-noise ratio, the more decision errors are made. A decision error leads to a large error in the noise estimate because the nearest decision point is no longer the correct decision point. Therefore, prior art systems such as that in the '130 receiver work best in a high SINR environment. The OFDM variants of the IEEE 802.11 standard, e.g., the IEEE 802.11a standard need to be able to operate in a relatively low signal-to-noise ratio environment. Thus there is a need for a method of using CSI that works in a relatively low signal-to-noise ratio environment.

Furthermore, when an estimate of the relative amount of noise or the relative amount of interference in each channel is used, averaging is usually used to increase the quality of the noise estimate. In the '130 receiver, the channel confidence value is averaged. Furthermore the interference energy is smoothed across frequency or over successive bursts as part of the spatial processing. Also, one can smooth over successive bursts. For example, one may use an exponential window to incorporate values of previous bursts.

Thus, the prior art application of CSI, e.g., in the '130 receiver requires computationally intense calculations.

WLAN devices are typically used in portable battery operated equipment. Additionally, WLAN access points, although wired, are typically powered "in-line," e.g., over Ethernet from a switch or router, and the amount of such in-line power is usually limited. Thus, there is a requirement for such WLAN equipment to have relatively low power consumption. There further is a need for such equipment to be relatively inexpensive. The computational complexity of prior art methods such as that of the '130 receiver are unsuitable for low-power and/or low cost solutions. A low cost solution, for example, is one that can be incorporated in a low power integrated circuit that implements a radio for WLAN applications.

Many of the techniques in the prior art can take a long time to estimate CSI metrics, even as long as 1 ms or more. There is a need in the art to determine a CSI metric relatively quickly.

There thus is a need in the art for an apparatus and method of using CSI that is relatively computationally simple. There further is a need in the art for an apparatus and method of using CSI that does not require estimating the relative amount of noise or the relative amount of interference in each channel. There further is a need in the art for an apparatus and method of using CSI that works well in a low signal-to-noise environment. There further is a need in the art to determine a CSI metric relatively quickly.

SUMMARY

Described herein is a method, apparatus, and carrier medium for determining channel state information (CSI) in an OFDM radio receiver. The determined information is digital in the form of a multi-bit measure of quality. The receiver is for receiving packets of OFDM data as a result of OFDM data being transmitted. The method includes forming an estimate of the channels of the subcarriers for received OFDM data to provide frequency responses of the channels of the subcarriers, and forming a measure of quality ("channel state information," "CSI") for the channels of the subcarriers based on the relative strength of the frequency responses.

The forming of the CSI does not require estimating the relative amount of noise or the relative amount of interference in each channel. Thus the method is relatively computationally simple compared to methods that require estimating noise.

The formed CSI is used in demodulating and/or decoding received OFDM data.

One embodiment of the method uses the relative amplitude of the frequency responses to form the CSI. Such an embodiment may be implemented using relatively few bits in the signal path. An alternate embodiment uses the relative squared amplitude of the frequency responses to form the CSI.

In one implementation, the forming of the CSI includes determining a measure of the average amplitude of the subcarriers, and scaling the relative amplitudes of the frequency responses according to the average amplitude measure to produce a scaled relative amplitude.

The receiver includes filtering. In one embodiment, the forming of the CSI includes reversing the effect of the receiver filtering such that the formed CSI varies as the relative amplitudes of the frequency responses corrected for the effect of the receiver filtering.

In one embodiment, using the formed CSI in demodulating and decoding includes weighting the results of demodulating by the CSI prior to decoding the demodulated data.

Apparatus and carrier medium embodiments are also disclosed herein. Other features and aspects of the invention are described below.

DETAILED DESCRIPTION

The invention describes a method and apparatus for using channel state information (CSI) in a multicarrier radio receiver, in particular, a radio receiver that uses orthogonal frequency division modulation (OFDM). In a multicarrier radio transmitter, including an OFDM radio transmitter, a signal for transmission is split into a set of subcarriers (also called "tones"), and each modulated than combined and transmitted. At the receiving end, the various subcarriers are determined then demodulated and decoded to construct the received signal. An OFDM transmitter typically uses the inverse discrete Fourier transform (IDFT), typically implemented as an inverse Fast Fourier Transform (IFFT), to form the signal for transmission from the modulated subcarriers, and an OFDM receiver typically uses the forward discrete Fourier transform (DFT), typically implemented as a Fast Fourier Transform (FFT) to form the received subcarriers from the received signal. Each of the subcarriers experiences a different channel. The signals through these different channels may experience a different level noise and interference. Channel estimation estimates the phase and amplitude response experienced by each of the subcarriers of the multicarrier signal, and such channel estimates are used to equalize the different subcarrier signals for the channel each experience. The quality of the estimated channel and of the channel estimate effects the reliability of the signal after equalization. One aspect of the invention is to use an indication of the reliability of the signal through each channel—the channel state information (CSI)—in the decoding process. The CSI is incorporated in the form of channel metrics for each subcarrier's channel.

Figure 1:
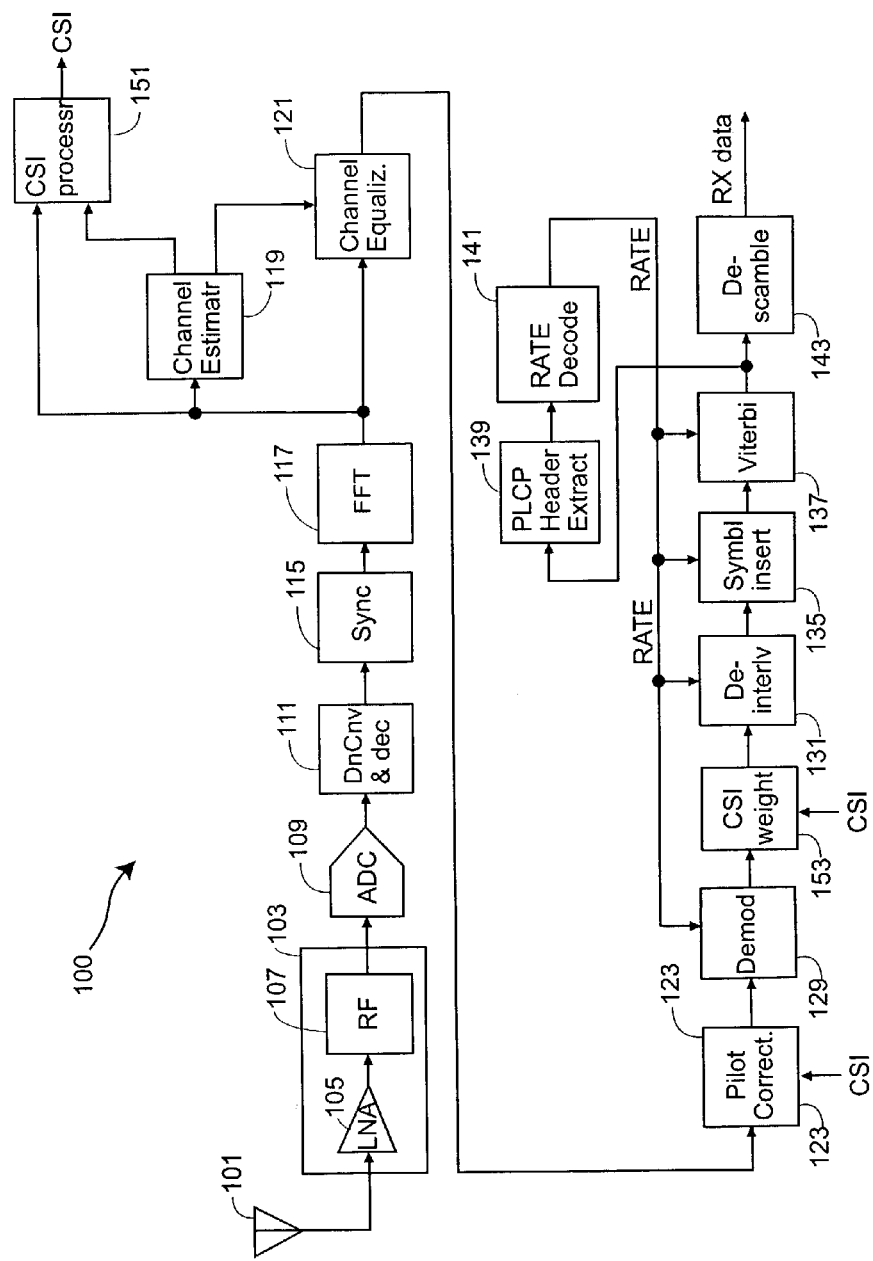
FIG. 1 shows a simplified block diagram of an OFDM receiver that incorporates an embodiment of the present invention.

FIG. 1 shows a simplified block diagram of a OFDM receiver 100 that may be used for processing signals conforming to OFDM variants of the IEEE 802.11 standard and that includes an embodiment of the invention. The inventive channel state processor that determines CSI measure is shown as block 151. One or both of blocks 123 and block 153 use the CSI measure according to different implementations. The invention is however not restricted to using CSI in receiver architectures such as shown in FIG. 1.

Note that in order not to obscure the inventive aspects, some details are left out of FIG. 1, including the presence of one or more first-in-first-out buffers, I-Q to polar and polar-to-I-Q coordinate converters—e.g., Cordics—and so forth. Such elements are not related to the inventive aspects of the invention.

A receive antenna 101 receives RF signals. A low noise amplifier 105 combined with other RF components 107 forms a receiver 103 that generates analog signals. Some embodiments of receiver 103 may produce baseband signals that require no further downconversion, while others may produce near-baseband IF signals that require further digital downconversion. The latter is assumed in this example. ADC 109 digitizes the signals. In one embodiment, block 111 further downconverts from the sampling frequency and decimates the signals to produce samples that enter a time synchronization unit 115. Synchronization is achieved by one or more methods such as estimating the short preamble's short symbol timing using a correlator and estimating the guard interval timing of the long preamble. The synchronization unit further includes frequency estimation and frequency correction using a rotator. The output of the rotator is presented to a 64-sample input buffer of a 64-sample discrete Fourier transformer 117 (DFT implemented as an FTT) for time-to-frequency conversion. The Fourier transformer 117 transforms the complex baseband time-domain samples of the received packet into complex frequency domain samples by a DFT operation. These complex frequency domain samples are the modulated and coded subcarriers corresponding to the OFDM data.

The path from the receive antenna 101 to the Fourier transformer 117 thus forms a receive path to receive and digitize a transmitted OFDM data packet and form a set of subcarriers corresponding to the received data.

Figure 2:
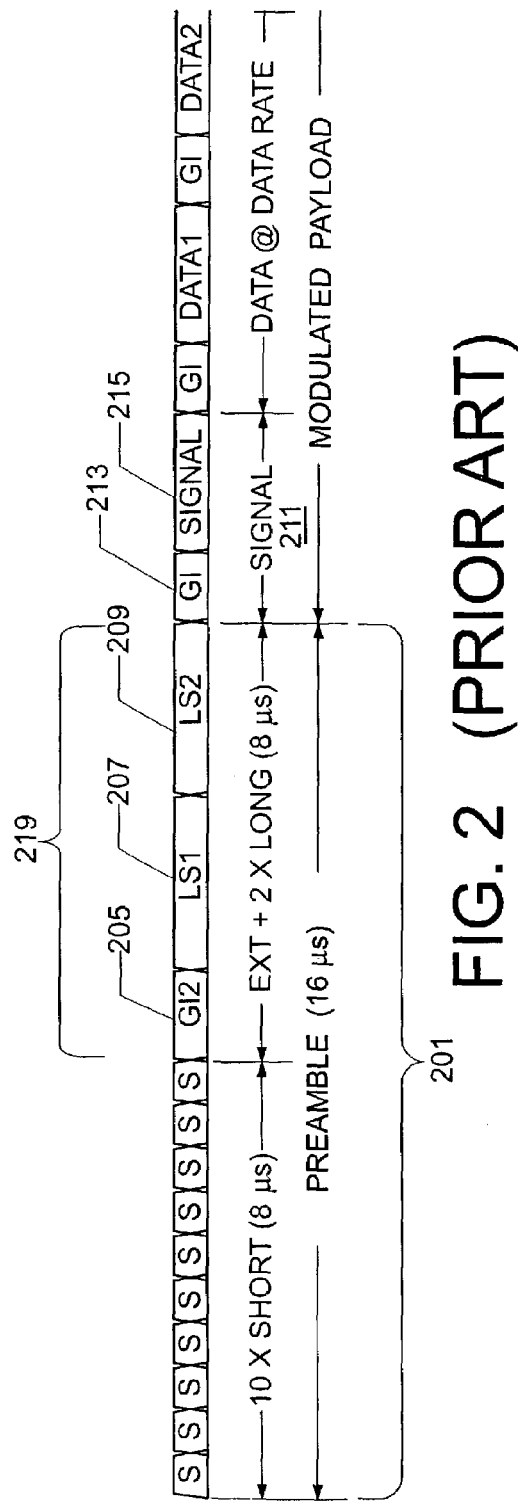
FIG. 2 shows a typical OFDM packet that conforms to the IEEE 802.11a standard and that includes a preamble with a short and a long preamble period that precede the signal payload.

FIG. 2 shows the structure of an OFDM packet as used in IEEE 802.11a WLANs. The packet starts with a preamble 201 provided for start of packet (SOP) detection, automatic gain control (AGC), diversity selection when diversity is used, for various other synchronization functions, and for channel estimation. The preamble is followed by the modulated payload, which starts with a known (low) data rate SIGNAL field 211 that provides information about the packet, followed by DATA fields at a rate specified in the signal field. Each data field includes a guard interval (cyclic extension).

The preamble 201 is 16 µs long and has two 8 µs parts: a first part ("short preamble part") consisting of set of 10 short symbols, and a second part ("long preamble part") 219 consisting of two long symbols 207 and 209, and a cyclic extension part (guard interval) 205. In a typical system, the short preamble part provides for SOP detection, AGC, diversity selection when diversity is used, coarse frequency offset estimation and timing synchronization. The long preamble part then provides for timing synchronization, channel estimation, and fine frequency offset estimation. Each long symbol 207 and 209 consists of 64 samples. The guard interval 205 consists of a 32 bit cyclic extension of the 64 samples.

The Fourier transformer 117 transforms the complex baseband time-domain samples of the long symbol of the preamble plus the data-carrying OFDM symbols of the received packet into complex frequency domain samples by a DFT operation. In one embodiment, these are in bit-reversed frequency order. In one embodiment, the output of Fourier transformer 117 is in the form of a set of amplitudes and phases. Not shown are coordinate transformer(s) such as Cordics to transform back and forth between rectangular (I-Q) and polar coordinates.

In one embodiment, the subcarriers corresponding to the first and the second long symbols are input into a channel response estimator block 119.

The channel estimator 119 produces estimates of the different channels for each of the subcarriers. By a channel estimate for a subcarrier is meant the impulse response or frequency response of that subcarrier's channel relative to that of the other subcarriers. In one embodiment, the channel estimator estimates the relative amplitude and phase responses for the subcarriers. The CSI aspects of the invention include using the amplitude (or amplitude squared) of the estimated channels.

One embodiment of the channel estimator 119 uses the long symbols of the preamble (see FIG. 2). Each long symbol consists of 53 subcarriers (including a zero value at dc), and is designed to exercise every subcarrier all at the same amplitude, with some subcarriers at 0° phase, while others at 180°. The two long symbols provide for better channel estimates than by using only one long symbol. One embodiment of the channel estimator is described in U.S. patent application Ser. No. 10/217,117 filed 12 Aug. 2002 to inventors Hart et al., and titled CHANNEL ESTIMATION IN A MULTICARRIER RADIO RECEIVER, incorporated herein by reference.

Channel equalization block 121 equalizes the subcarriers for the different channels each experiences and uses the channel estimator output for the equalization. According to the OFDM variants of the IEEE 802.11 standard, four of the subcarriers in each data symbol are pilots that can be used for further frequency/phase correction and also for further amplitude correction. In receiver 100, the equalized signals are coupled to a pilot tone correction unit 123 for further frequency/phase correction.

In another embodiment, the pilot subcarriers are also used for amplitude correction. See FIG. 4 and the description below.

Not shown are any buffers required for buffering information while the SIGNAL field is demodulated and decoded to produce the modulation type and coding rate of the remainder of the packet, shown as RATE in FIG. 1.

The other elements of receiver 100 include a demodulator 129, a de-interleaver 131, a symbol inserter (de-puncturer) 135, a Viterbi decoder 137 and a descrambler 143 that together demodulate and decode the received 64-samples frames to produce a serial bit stream. Not shown is a parallel-to-serial converter that reads out the FFT output in serial form. Also not shown is any serial-to-parallel converter that converts the serial stream to parallel words at the output.

The path of receiver 100 from the channel equalizer 121 to the descrambler together form a demodulating and decoding path that accepts, demodulates, and decodes the set of received subcarriers to form decoded data.

An aspect of the invention is that the demodulating and decoding path includes a CSI input coupled to the CSI processor such that channel state information is used in demodulating and decoding the set of received subcarriers.

Initially, the demodulating and decoding elements are set to process the SIGNAL field. Once the RATE information, including the modulation scheme is determined, these elements are set to demodulate the data frames of the payload. In this embodiment, the Viterbi decoder 137 is a ½-rate decoder, and the symbol inserter 135 is included to insert dummy signals to convert non-½ rate data into data suitable for the Viterbi decoder 137.

In accordance to one aspect of the invention, the demodulator 129 produces soft decisions that are weighted by a channel state information (CSI) weight block 153 so that data from subcarriers that are less reliable are weighted less than subcarriers that of the more reliable channels. The weighting is by a CSI signal for each subcarrier that is generated by a CSI processor 151.

Another aspect of the invention is an embodiment of the pilot correction unit 123 that also uses the CSI channel state signal. The pilots used in the correction by unit 123 are each weighted by the respective CSI signal so that pilots that are relatively unreliable are weighted less in the correction than more reliable pilots.

One aspect of the invention is the design of the CSI processor 151. One embodiment of the CSI processor 151 uses the channel estimates produced by the channel estimator 119 as well as the output of the FFT.

Use of the term "processor" does not necessarily mean that the CSI processor 151 is or includes a programmable processor. Some implementations may indeed be in the form of one or more processors running a set of instructions. The CSI processor 151 may in general be implemented as hardware, in a software embodiment operating on one or more processors, or as an embodiment combining software and hardware aspects.

Note that the invention does not depend on any particular method of producing the channel estimates of each subcarrier. Thus, while one embodiment uses channel estimates that remain the same for all symbols in a packet, another uses channel estimates that are updated as more data is decoded (see FIG. 4 and the description below).

Figure 3:
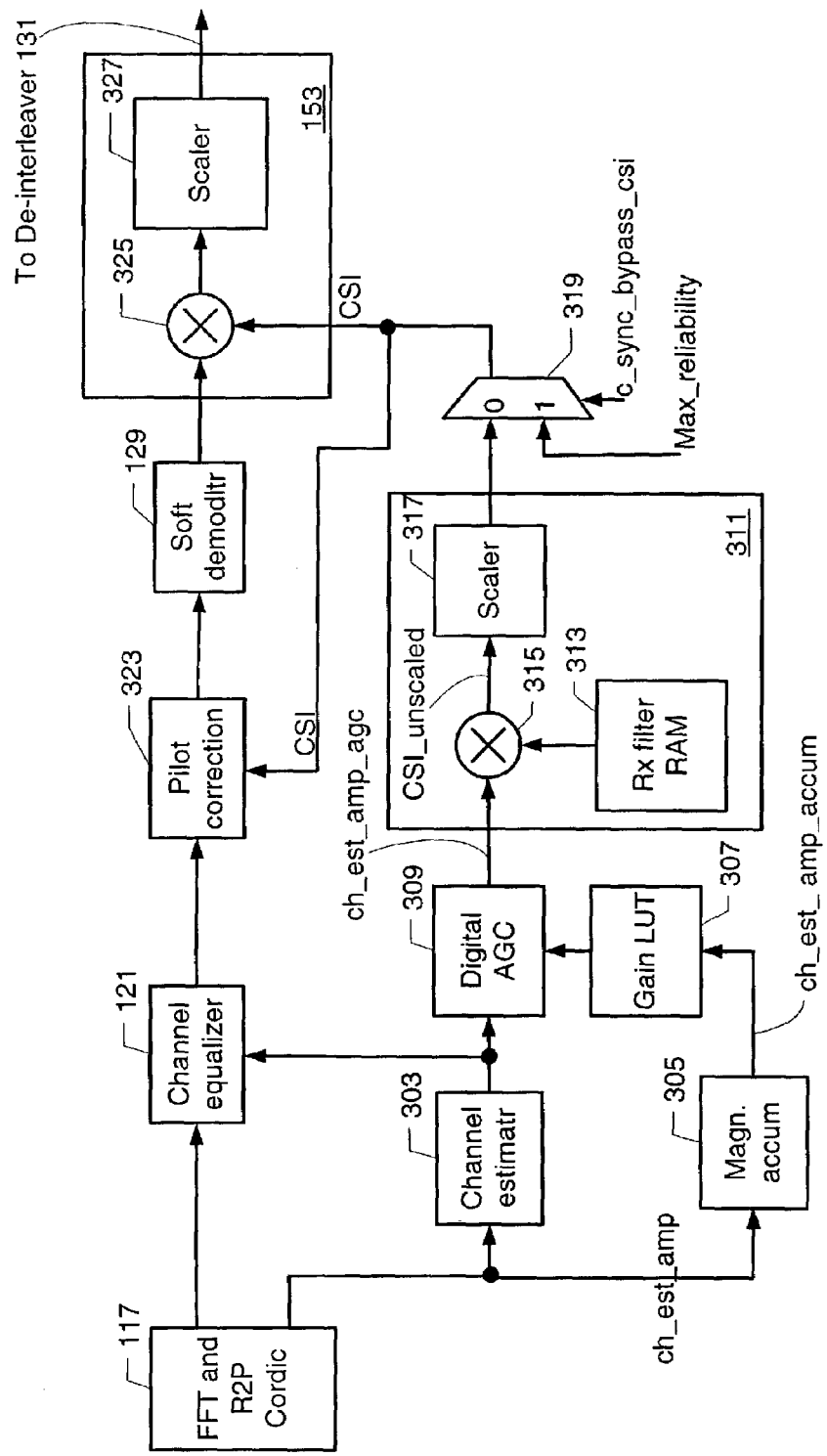
FIG. 3 shows a simplified block diagram that includes an embodiment of the channel state information processor of the receiver shown in FIG. 1.

FIG. 3 shows a block diagram that includes the components of one embodiment of the CSI processor 151. One feature of the CSI processor 151 is that no estimate of the relative amount of noise or interference in each channel noise is used to determine the CSI. A measure of the relative strength of each subcarrier's channel estimate is used. In one embodiment, the relative measure of strength is the power/energy in the frequency response—e.g., the square of the amplitude of the channel response of each of the subcarriers. In another embodiment—that shown in FIG. 3—the measure of the relative strength is the amplitude of the channel response of each subcarrier. By using the amplitude rather than the energy or power, one aspect of the CSI processor is that the signal path requires fewer bits than in the case that the relative energy—e.g., square of the amplitude of the channel response—is used.

One embodiment uses the amplitude of the channel response determined by the channel estimator 303. In one version, the channel estimator is that described in above-mentioned U.S. patent application Ser. No. 10/217,117 that uses the two long symbols in the preamble of each packet to determine the amplitude of the channel response. The amplitude in one implementation is a 12-bit unsigned number.

Because the channel amplitude values are before channel equalization, the amplitude values are sensitive to receiver gain control variability and FFT scaling. It is desired therefore to ensure that overly strong FFT outputs do not clip, and furthermore, that overly weak FFT outputs are avoided across the channels of the subcarrier. To this end, an automatic gain control (AGC) unit 309 that uses a measure of the average amplitude to adjust all the amplitudes scales the channel amplitude response. Accumulator block 305 obtains a measure of the average amplitude denoted ch_est_amp_accum. In one embodiment, the channel estimate accumulator 305 drops the four lowest significant bits of each 12-bit amplitude and sums the amplitudes over the two long symbols, then drops the seven lowest significant bits of the sum to generate ch_est_amp_accum as an unsigned 8-bit signal. The ch_est_amp_accum measure of the average channel response is used to drive a device 307 that stores a lookup table (gain LUT). The LUT provides the gain multiplier for a digital automatic gain control (AGC) unit 309. Adding AGC to the channel amplitude path avoids an overly strong FFT output clipping, and even more importantly, avoids an overly weak FFT output causing low CSI weights that in-turn might cause undesirable loss of demodulator precision.

In one embodiment, the gain LUT in device 307 is as shown below in Table 1.

TABLE 1

| Input | Multiplier |
| --- | --- |
| >=64 | 3/128 |
| 0011XXXX | 1/32 |
| 00101XXX | 5/128 |
| 00100XXX | 3/64 |
| 00011XXX | 1/16 |
| 000101XX | 5/64 |
| 000100XX | 3/32 |
| 000011XX | 1/8 |
| 0000101X | 5/32 |
| 0000100X | 3/16 |
| 0000011X | 1/4 |
| 00000101 | 5/16 |
| 00000100 | 3/8 |
| <3 | 2 | where X indicates either a 0 or 1.

In another embodiment, further digital AGC thresholds of 80 and 96 with multipliers of 5/256 and 1/64 are added to the gain LUT 307. The AGC unit 309 carries out the multiplication by the multiplier generated by the gain LUT, then clips the result to 6 bits, so that the output of the digital AGC unit, denoted ch_est_amp_agc, is unsigned 6-bits.

In prior art CSI units, any measure of a subcarrier strength is normalized by the estimate of the noise for that subcarrier. Any filtering in the receiver would affect both the signal measure and the noise measure. Because embodiments of the present invention do not calculate an estimate of the noise strength, it is desirable to take into account the effects of any receiver filters. Typically, each subcarrier's amplitude after AGC is effected differently depending on the filtering used. The implementation described here gives for the case of no fading nominal values of around 36 for the center subcarriers and around 17 for the edge subcarriers that typically are −6 dB from the center subcarriers. "Edge" here refers to band-edge subcarriers that are attenuated by the filters used in the receiver. "Center" refers to mid-band tones.

In one embodiment, the effects of such receiver filters are reversed in an inverse filter unit 311. One embodiment of inverse filter unit 311 includes a receiver shaper memory (Rx filter store) 313 to store the inverse filter coefficients for each subcarrier that reverse the effects of the receive filter. In one embodiment, the Rx filter store 313 is a 64 by 6 RAM that includes values that reverse the effect of the receive filters. A typical Rx filter store contains data that is approximately U-shaped, with edges up to 2.2 times the center values. The center subcarriers have a nominal value of 28 or 29, while the edge values are in the range of 58. The filter store values are read out to multiplier 315 that reverses the effect of the receive filters that typically have the edges at −3 dB from the center subcarriers. Again, these numbers are nominal values for the case of no fading.

Note that the accounting for the receive filters takes into account that the order of, e.g., the index of the subcarriers out of the FFT unit is bit-reversed. In one embodiment, the Rx filter store 313 is written normally but read out in bit-reversed order to modify the ch_est_amp_agc signal in bit reversed order.

Note that the filter RAM 313 is written to reverse the effects of the filters, assumed to be known. One embodiment of analog electronics unit 105 uses a superheterodyne architecture that includes a surface acoustic wave (SAW) filter in the intermediate frequency (IF) path, and one or more baseband filters, some of which may be digital filters included in the downconversion/decimation unit 111, the general characteristics of which are known. Other architectures also include some type of receive filtering, the general characteristics of which are known in advance, at least to some level of approximation.

The output of the multiplier 315 is an unscaled CSI signal called CSI_unscaled that is a 12 bits unsigned number, with a nominal value of 1024. Scaler 317 then scales the CSI_unscaled signal including dropping the 7 least significant bits to produce a 4-bit CSI signal having a nominal value of 8.

One embodiment includes a circuit that provides for bypassing the CSI circuit according to a signal c_sync_byass_CSI. When c_sync_byass_CSI is true, CSI bypass circuit outputs the nominal value 8 for the CSI signal of all the subcarriers.

The CSI signal called CSI is used as a measure of the channel state that provides a relative measure of the quality of the channels of the subcarriers.

In one embodiment, the demodulator is in the I-Q domain, so a coordinate transformer (a Cordic, not shown) is included in the signal path to convert to rectangular coordinates in the case that the signal from the Fourier transformer is in polar coordinates. One embodiment of the invention uses the CSI signal to scale the output of the demodulator 129 that produces the soft decisions. In one embodiment, the demodulator output is (symmetrically) rounded to 5 bits. The CSI weight unit 153 includes a multiplier 325 that multiplies the soft decision by the CSI value, and then a scaler 327 that scales the multiplied decision to a 5-bit value. The scaling of the weighted soft decisions is divided by 8 then rounded to the nearest integer, except that halves are rounded away from 0. The rounded results are made unsigned by adding 16. The resulting CSI-weighted soft decisions are unsigned 5 bits. These then are de-interleaved (unit 131) and de-punctured (135) prior to being input to the Viterbi decoder 137 which is set, in one embodiment, to decode using conventional Viterbi decoder metrics, e.g., metrics set to be for a channel characterizable as an additive white Gaussian noise (AWGN) channel.

In an improved embodiment, the CSI is also used in the phase correction carried out by pilot correction unit 323 such that the contribution to the correction by each pilot is weighted by the CSI value for the channel of that pilot. Thus, FIG. 3 shows a CSI input to the pilot correction unit 323.

Figure 4:
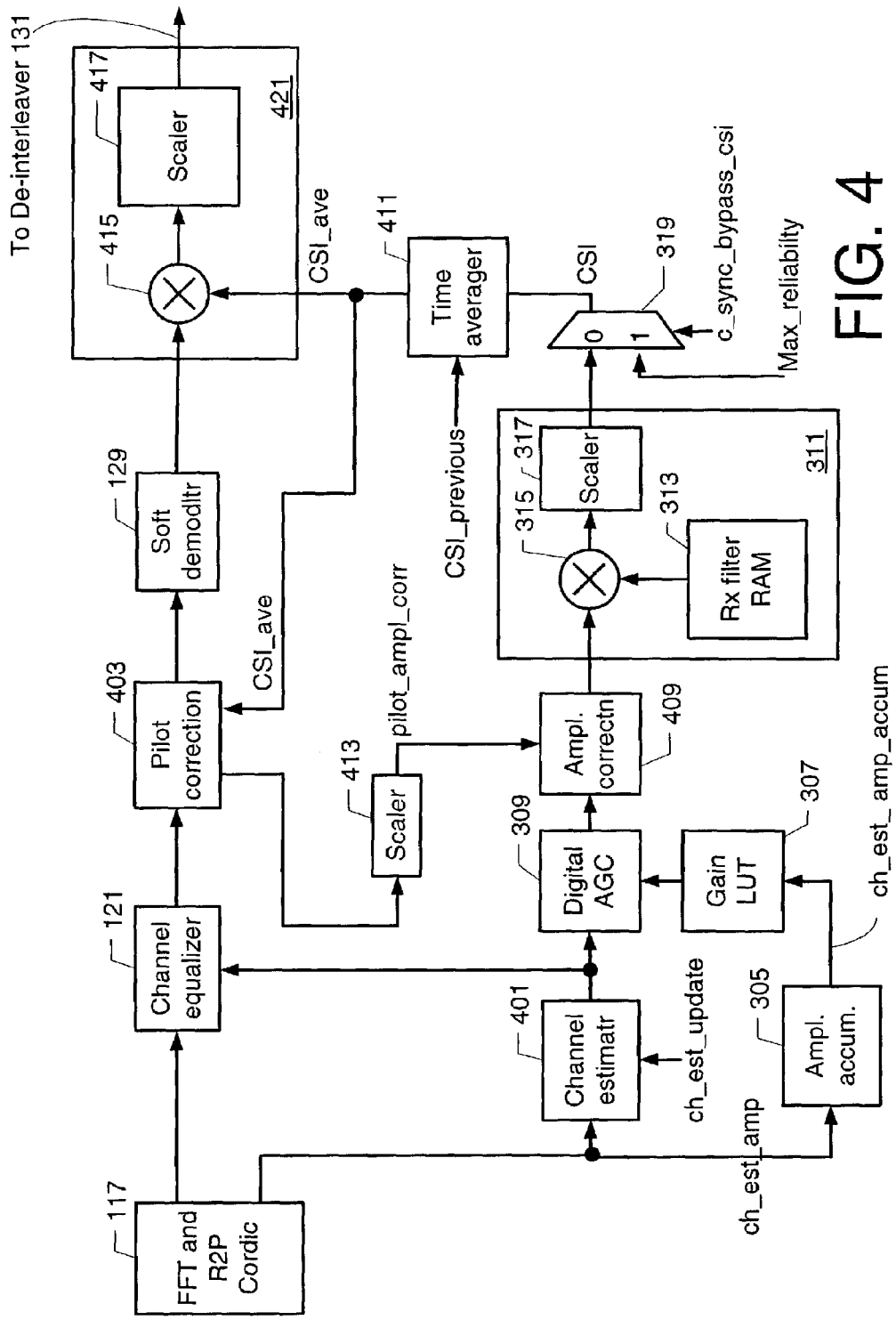
FIG. 4 shows a simplified block diagram that includes another embodiment of the channel state information processor of the receiver shown in FIG. 1.
Figure 5:
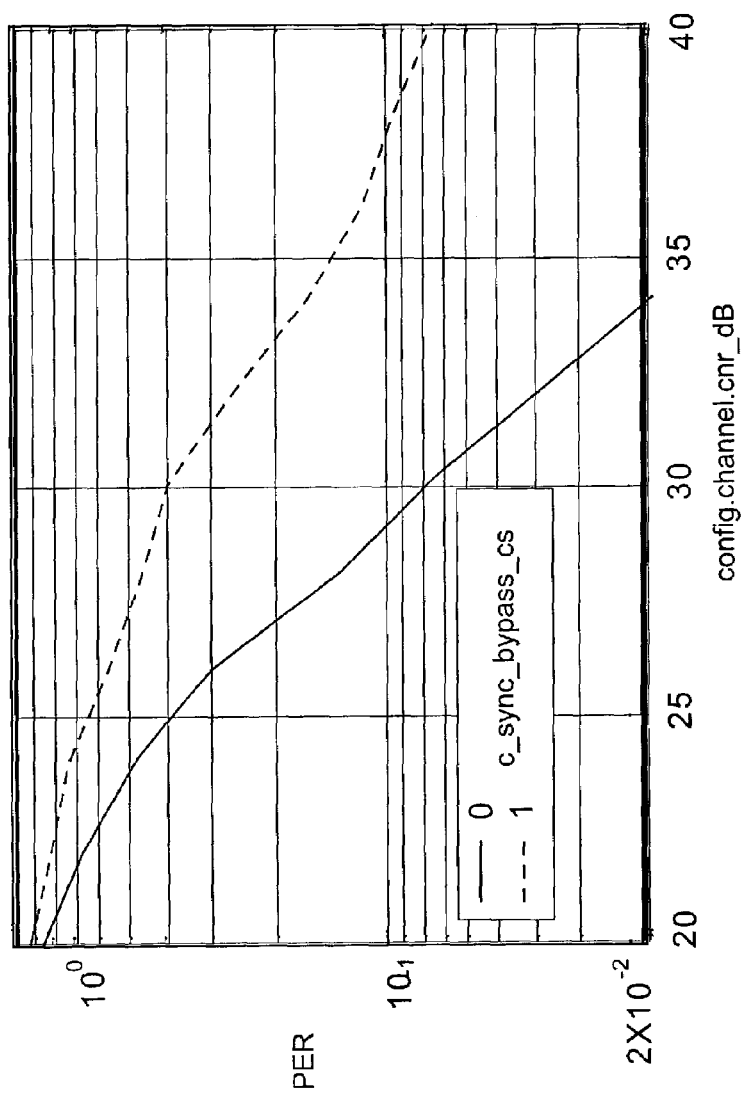
FIG. 5 shows the packet error rate vs. carrier-to-noise ratio results of a simulated radio receiver corresponding to the system shown in FIG. 3 with and without the use of CSI.

FIG. 4 shows a block diagram that shows another embodiment of the CSI processor that includes some additional features from that of FIG. 3.

Because there may be correlation between neighboring subcarriers, one embodiment includes smoothing of CSI by averaging the metrics in frequency between neighboring subcarriers. Such smoothing is already incorporated in those embodiments that use a channel estimator as described in above-mentioned U.S. patent application Ser. No. 10/217, 117 to Hart et al.

The channels for the subcarriers can change during each packet. FIG. 4 shows another aspect of the invention: that the CSI values are re-calculated from the updated channel estimates as such updates are obtained. Channel tracking systems are known that provide an update to the channel estimates. See for example H. Schmidt, V. Kuhn, K. D. Kammeyer, R. Rückriem, and S. Fechtel: "Channel Tracking in Wireless OFDM Systems," CSI 2001, Orlando, Fla., USA, 22-25 Jul. 2001, incorporated herein by reference that described one such method that uses decisions from the Viterbi decoder output, then re-modulates such decided data to create additional training data with which to update the channel estimates. Such update information is shown as signal ch_est_update that is input to the channel tracking channel estimator 401 in FIG. 4.

The embodiments of the invention that use channel tracking to update channel estimates within a packet do not depend on any particular method of obtaining such channel updates. Thus details of how the ch_est_update are obtained are not shown in FIG. 4. See the above CSI 2001 article by Schmidt for one implementation.

The embodiment shown in FIG. 4 further includes a time averager 411 to average the CSI in time from symbol to symbol. This smoothes the CSI values within a packet. Time averager 411 has as input the previous CSI value, denoted CSI_previous. In order not to obscure the inventive features, such details as the memory needed to store the previous CSI value are not shown. The smoothed CSI value, denoted CSI_ave, is used to weight the soft decisions in CSI weighter 421 that includes a weighting multiplier 415 and a scaler 417 to produce weighted decisions for eventual input into the Viterbi decoder.

The subcarriers in a packet conforming to the OFDM variants of the IEEE 802.11 standard include four pilot subcarriers. In addition to providing for phase/frequency correction, one aspect of the invention is using the pilots to provide amplitude information that can be used to further scale the CSI and/or amplitude information. The embodiment shown in FIG. 4 includes pilot correction unit 403 that provides pilot amplitude signals that are coupled by a scaler 413 to produce pilot amplitude correction signals, denoted pilot_ampl_corr that are input to an amplitude correction unit 409 in the CSI signal path.

Figure 6:
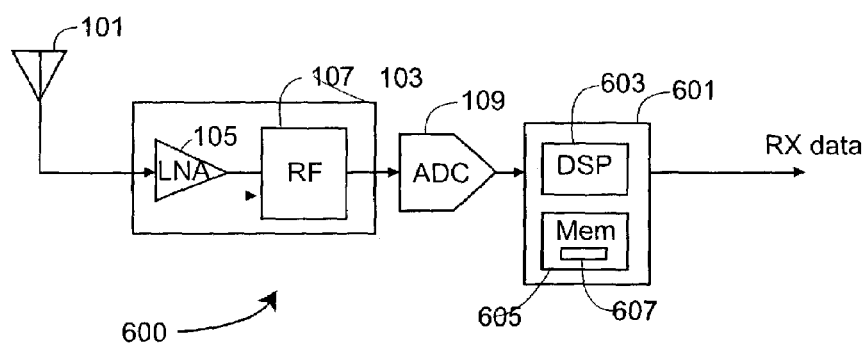
FIG. 6 shows a simplified block diagram of an OFDM receiver that uses a digital signal processing (DSP) system to implement many of the receiver functions.

FIG. 6 shows a simplified block diagram of an OFDM receiver 600 that uses a digital signal processing (DSP) system 601 to implement many of the receiver functions that are carried out in the receiver shown in FIG. 1, including the CSI processing elements shown in FIG. 3 or FIG. 4. The DSP system 601 receives the signals after analog-to-digital conversion by ADC 19 and includes one or more processors 603 and one or more memories 605. Memory 605 includes instructions 607 to instruct the processor(s) 603 to implement the steps of a method implemented by the blocks shown in FIG. 1, including the CSI processing elements shown in FIG. 3 or FIG. 4.

FIG. 6 shows the results of a simulation that compares the performance of a receiver that uses CSI to one that does not. The channel state processor is as shown in FIG. 3. The CSI is used to weight the results of the soft demodulator 129. No CSI is used for the pilot correction. The results show the packet error rate (PER) for different carrier-to-noise ratio (CNR) values for 1000 bytes of IEEE 802.11a data simulated to have fading characteristics with a delay spread of 75 ns and a data rate of 54 Mbit/s. The timing is assumed to be imperfect, i.e., sample points assumed to be estimated by a correlation method. The broken line shows the average of the results with no CSI, i.e., with c_sync_byass_CSI true, while the solid line shows the average of the results with CSI, i.e., with c_sync_byass_CSI false. It can be noted that CSI significantly improves the performance of the receiver in the presence of fading. Based on this simulation, a gain in performance of about 10 dB is likely obtainable in an actual receiver for 54 Mbit/s data in the presence of Rayleigh fading. This is achieved using an inventive CSI processor that avoids computationally complex noise estimation and that uses channel amplitude to determine the CSI measure so that the CSI processor need only a relatively modest dynamic range.

The embodiments described above use the formed CSI in demodulating and decoding received OFDM data. In particular, the embodiments described above use the CSI information to weight the soft decisions by the CSI measure and then feed the weighted soft decisions to a Viterbi decoder that is designed with conventional metrics. Other embodiments may use the CSI information in demodulating and decoding in other ways, e.g., in the decoding as a factor in the metrics of a Viterbi decoder. How to so use CSI is known in the art.

Thus several embodiments of a CSI processor and of a method for determining channel state information have been described.

Figure 7:
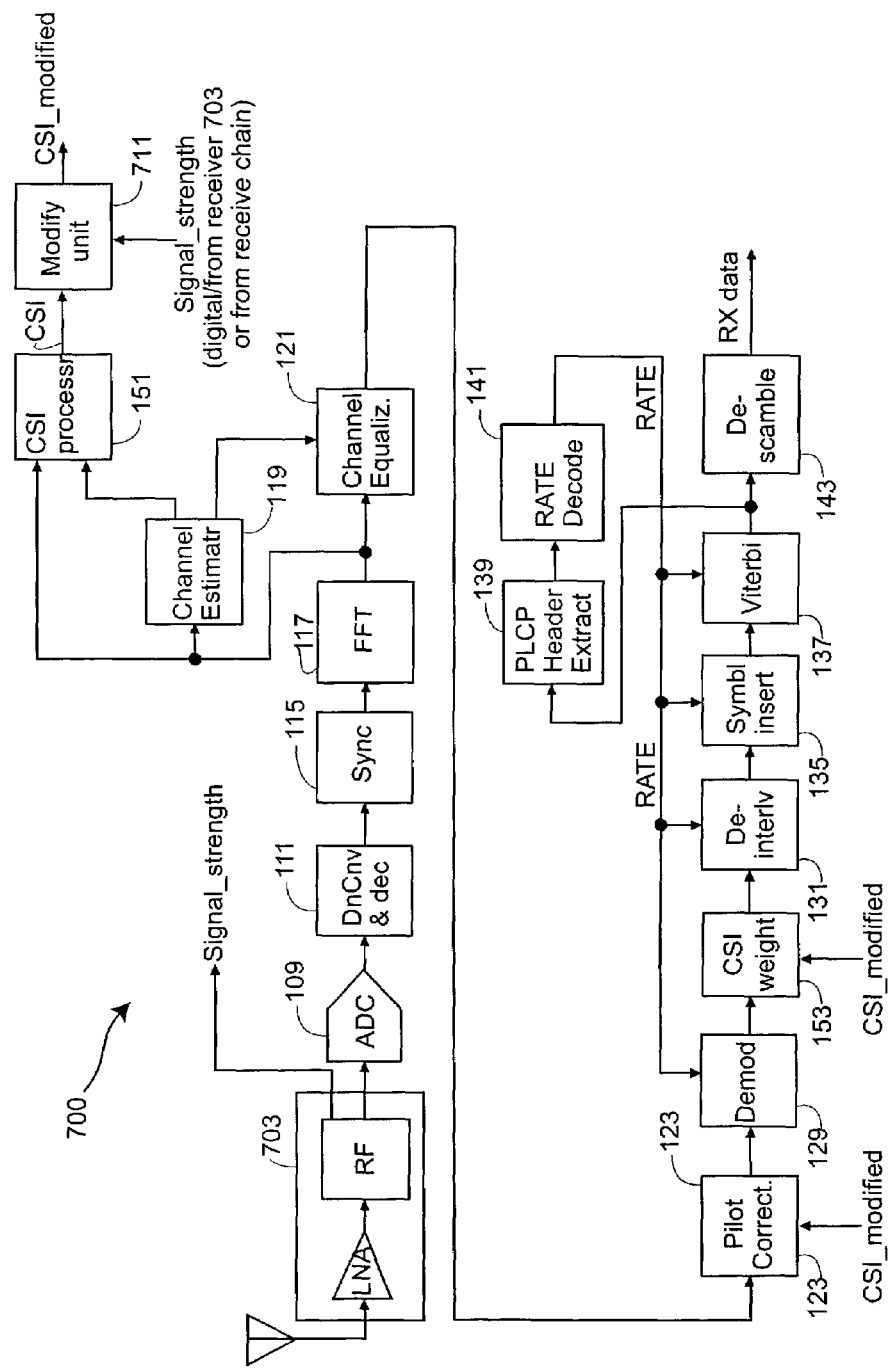
FIG. 7 shows a simplified block diagram of one embodiment of the invention that includes the modifying of how the CSI influences the receiver according to signal strength.

FIG. 7 shows a simplified block diagram that adds another feature: the modifying of how CSI influences the receiver according to signal strength. When a receiver operates in a relatively high noise environment, as indicated by a relatively low signal strength, the inventors have found that using the CSI information in demodulating and decoding as described above provides significant improvement (see simulation results below). However, when operating in a relatively high signal strength, when the link performance is significantly influenced by degradations in the transmitter, the inventors have found that it may be desirable to modify how the CSI weights information based on the strength of the received signal. This may be because degradations in the transmitter that corrupt the signals of each subcarrier become relatively more important than the channel state. Such degradations may include I/Q mismatch, phase noise, compression, quantization and so forth. In yet another embodiment, described in FIG. 7, a modified CSI measure denoted CSI_modified is used in demodulating and decoding. The receiver shown as 703 in FIG. 7 produces an indication of signal strength. Such an indication may be the RSSI, or may be some other measure. The indication of signal strength (in digitized form) is used to modify the CSI measure as produced by CSI processor 151 by modifying unit 711 to produce the modified CSI CSI_modified. Note that in the case the receiver produces an analog indication of received signal strength, such measure is digitized for use in the modifying unit 711.

Different embodiments of modifying unit 711 determine CSI_modified from the CSI measure according to the indication of received signal strength based different criteria, e.g., based on an a priori assumption of transmitter and receiver quality, or adaptively based on statistics of received signals.

In one embodiment, the modifying unit is such that CSI_modified is the CSI measure produced by CSI processor 151 when the received signal strength is below a selected threshold, and CSI_modified is a constant for all subcarriers when the received signal strength is above the selected threshold. In another embodiment, the modifying unit is such that CSI_modified is the CSI measure produced by CSI processor 151 when the received signal strength is below a first selected threshold, and CSI_modified is a constant for all subcarriers when the received signal strength is above a second selected threshold. In one embodiment, the first and second thresholds are equal so that CSI is used when the signal strength is below the threshold, and not used (CSI_modified constant for all subcarriers) when the signal strength is above the threshold. In another embodiment, the first and second thresholds are different, and when the signal strength is between the first and second thresholds, the contribution of the CSI as produced by CSI processor 151 is modified linearly between full contribution for a received signal strength at the first threshold and no contribution for a received signal strength at the second threshold. Note using the system of FIG. 7, when the first and second thresholds are set very high, the CSI measure is unmodified and becomes the CSI_modified measure.

It should be appreciated that although the invention has been described in the context of OFDM variants of the IEEE 802.11 standard, the invention is not limited to such contexts and may be utilized in various other applications and systems, for example in other systems that use OFDM. OFDM is one example of a multicarrier system in which the signal for transmission is split into a set of subcarriers. The invention may also be applicable to other wireless receivers that use multicarriers.

While an embodiment has been described for operation in an OFDM receiver with RF frequencies in the 5 GHz range and 2.4 GHz range (the 802.11a and 802.11g variants of the IEEE 802.11 standard), the invention may be embodied in receivers and transceivers operating in other RF frequency ranges. Furthermore, while a transceiver embodiment for operation conforming to the IEEE 802.11 OFDM standards has been described, the invention may be embodied in transceivers conforming to other standards and for other applications, including, for example other WLAN standards and other wireless standards. Applications that can be accommodated include IEEE 802.11a COFDM wireless LANs and links, wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

Note that in one embodiment, the output of the Fourier transformer is in rectangular coordinates and a rectangular-to-polar converter (a Cordic) is used prior to the rest of the processing chain so that the processing occurs in the amplitude and phase domain. In alternate embodiments, the output of the Fourier transformer is maintained in rectangular coordinates so that the processing occurs in the rectangular (e.g., I-Q) domain.

Note that in one embodiment, the output of the Fourier transformer is in bit reversed order. In alternate embodiments, the output of the Fourier transformer is in some other order. The invention does not depend on any particular ordering of the Fourier transformer output.

Note that while the embodiments shown herein use for forward discrete Fourier transform implemented as an FFT, those skilled in the art will recognize that the DFT/FFT, IDFT/IFFT may be considered to be identical.

Note that in the embodiment shown in FIG. 7, the modified CSI is produces using an indication of received signal strength produced in the receiver 703, e.g., as an RSSI signal. In alternate embodiments, the indication of the received signal strength is produced not necessarily in analog at the receiver 703, but in other parts of the receive chain after digitization.

Furthermore, while in the embodiment shown in FIG. 7, the modified CSI is produced using an indication of received signal strength, there may be further modification based on other criteria. Thus, by saying that the modified CSI is produced using an indication of received signal strength, those in the art will understand this to mean that the that the modified CSI is produced using at least an indication of received signal strength.

Note that while the embodiments of the channel estimator described above directly form frequency responses of the channels of the subcarriers as the estimates of the channels of the subcarriers, other embodiments may directly form estimates in another form, e.g., in the form of impulse responses or in some other form. Those skilled in the art will recognize that the impulse response has a one-to-one relationship to the frequency response. Thus forming an estimate of the channels of the subcarriers for received OFDM data to provide frequency responses of the channels of the subcarriers includes using a channel estimator that forms the frequency responses, using a channel estimator that forms the impulse responses, and using a channel estimator that estimates the channels in some other form.

While embodiments described above use the CSI information in a receiver that operates with a single antenna, it should be appreciated that the CSI information can also be used in a receiver that uses multiple antennas to provide antenna diversity. Such diversity may be provided by separate antennas that are spatially separated, by antennas that are co-located but use different polarization, and by other mechanisms. The antenna signals may be processed by separate receive electronics to produce receive signals that can be combined by a spatial processor. The spatial processor may, for example, be used to provide several "spatial channels" over the same conventional channel to provide what is called spatial division multiple access (SDMA). The multiple inputs thus provided may be used in a multiple input multiple output (MIMO) configuration. See for example above-referenced U.S. Pat. No. 6,442,130 (the '130 receiver) for how to modify the embodiments described above to produce a receiver that includes a spatial processor.

One embodiment of each of the apparatuses described herein is in the form of a computer program that executes on a processing system, e.g., a one or more processors that are part of integrated circuit that carries out the signal processing of an OFDM receiver. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a memory, or a magnetic storage device such as a diskette or a hard disk, or an optical storage device such as a CD-ROM.

It will be understood that the steps of methods discussed are performed in one embodiment by an appropriate processor (or processors) of a processing (i.e., computer or DSP) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

All publications, patents, and patent applications cited herein are hereby incorporated by reference.

Note that one embodiment described herein uses the amplitude of the channel responses. By "amplitude" here we mean to include estimates of the amplitude, such as using the maximum if the absolute value of I and Q, and so forth. Another embodiment uses the square of the amplitude. By this we mean to include using approximations to the amplitude squared.

Note also that in one embodiment, the CSI weight block immediately follows the demodulator. In alternate embodiments, the CSI weight block can be placed after the deinterleaver and/or after the de-puncturer, in which case the CSI itself is deinterleaved and/or de-punctured.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A method for determining channel state information (CSI) in an OFDM radio receiver the receiver for receiving packets of OFDM data comprising subcarriers as a result of OFDM data being transmitted the method comprising the steps of:
   forming an estimate of the channels of the subcarriers for received OFDM data to provide frequency responses of the channels of the subcarriers;
   forming a measure of quality ("channel state information," "CSI") for the channels of the subcarriers based on the relative strength of the frequency responses, the forming of the CSI not requiring estimating the relative amount of noise or interference in each channel; and
   using the formed CSI in demodulating and decoding received OFDM data,
wherein the forming of the CSI uses the relative amplitude of the frequency responses and wherein the forming of the CSI includes:
   determining a measure of the average amplitude of the subcarriers; and
   scaling the relative amplitudes of the frequency responses according to the average amplitude measure to produce a scaled relative amplitude.

2. A method for determining channel state information (CSI) in an OFDM radio receiver, the receiver for receiving packets of OFDM data comprising subcarriers as a result of OFDM data being transmitted, the method comprising the steps of:
   forming an estimate of the channels of the subcarriers for received OFDM data to provide frequency responses of the channels of the subcarriers;
   forming a measure of quality ("channel state information," "CSI") for the channels of the subcarriers based on the relative strength of the frequency responses, the forming of the CSI not requiring estimating the relative amount of noise or interference in each channel; and
   using the formed CSI in demodulating and decoding received OFDM data,
wherein the forming of the CSI uses the relative amplitude of the frequency responses, wherein the receiver includes filtering, and wherein the forming of the CSI further includes:
   reversing the effect of the receiver filtering,
such that the formed CSI varies as the relative amplitudes of the frequency responses corrected for the effect of the receiver filtering.

3. The method as recited in claim 1, wherein using the formed CSI in demodulating and decoding includes:
   weighting the results of demodulating by the CSI prior to decoding the demodulated data.

4. A method for determining channel state information (CSI) in an OFDM radio receiver, the receiver for receiving packets of OFDM data comprising subcarriers as a result of OFDM data being transmitted, the method comprising the steps of:
   forming an estimate of the channels of the subcarriers for received OFDM data to provide frequency responses of the channels of the subcarriers;
   forming a measure of quality ("channel state information," "CSI") for the channels of the subcarriers based on the relative strength of the frequency responses, the forming of the CSI not requiring estimating the relative amount of noise or interference in each channel; and
   using the formed CSI in demodulating and decoding received OFDM data,
wherein the OFDM data includes pilot subcarriers, and wherein the receiver includes pilot correction that uses knowledge of the pilot subcarriers for phase/frequency correction, the method further comprising:
   using the formed CSI in the pilot correction such that influence of received pilot subcarriers is according to the CSI.

5. The method as recited in claim 1, wherein the channel estimating produces channel estimates that are static for a received packet of data, such that the formed CSI does not vary for a received packet of data.

6. The method as recited in claim 1, wherein the channel estimating includes updating the channel estimates as more data of a packet is decoded, the method further including:
   updating the CSI measure as the channel estimates are updated,
such that the formed CSI may vary for different parts of a received packet of data.

7. A method for determining channel state information (CSI) in an OFDM radio receiver, the receiver for receiving packets of OFDM data comprising subcarriers as a result of OFDM data being transmitted, the method comprising the steps of:
   forming an estimate of the channels of the subcarriers for received OFDM data to provide frequency responses of the channels of the subcarriers;
   forming a measure of quality ("channel state information," "CSI") for the channels of the subcarriers based on the relative strength of the frequency responses, the forming of the CSI not requiring estimating the relative amount of noise or interference in each channel;
   using the formed CSI in demodulating and decoding received OFDM data, and
   averaging the formed CSI with one or more previously formed CSI values to produce a time averaged CSI.

8. A method for determining channel state information (CSI) in an OFDM radio receiver, the receiver for receiving packets of OFDM data comprising subcarriers as a result of OFDM data being transmitted, the method comprising the steps of:
   forming an estimate of the channels of the subcarriers for received OFDM data to provide frequency responses of the channels of the subcarriers;

forming a measure of quality ("channel state information," "CSI") for the channels of the subcarriers based on the relative strength of the frequency responses, the forming of the CSI not requiring estimating the relative amount of noise or interference in each channel;

using the formed CSI in demodulating and decoding received OFDM data, and smoothing the CSI of each subcarrier channel with the CSI values of neighboring subcarrier channels to produce a frequency smoothed CSI.

9. The method as recited in claim 1, wherein the receiver conforms to one or more OFDM variants of the IEEE 802.11 standard.

10. A method for determining channel state information (CSI) in an OFDM radio receiver, the receiver for receiving packets of OFDM data comprising subcarriers as a result of OFDM data being transmitted, the method comprising the steps of:

forming an estimate of the channels of the subcarriers for received OFDM data to provide frequency responses of the channels of the subcarriers;

forming a measure of quality ("channel state information," "CSI") for the channels of the subcarriers based on the relative strength of the frequency responses, the forming of the CSI not requiring estimating the relative amount of noise or interference in each channel; and using the formed CSI in demodulating and decoding received OFDM data, wherein the OFDM data includes pilot subcarriers, and wherein the receiver includes pilot correction that uses the knowledge of the pilot subcarriers for amplitude correction, the forming of the CSI further including:

using the pilots to provide amplitude information to further scale the CSI.

11. The method as recited in claim 1, wherein using the formed CSI in demodulating and decoding includes:

demodulating to produce soft decisions; and decoding data dependent on the soft decisions by a Viterbi decoder that uses the CSI in forming Viterbi decoder metrics.

12. A method for determining channel state information (CSI) in an OFDM radio receiver, the receiver for receiving packets of OFDM data comprising subcarriers as a result of OFDM data being transmitted, the method comprising the steps of:

forming an estimate of the channels of the subcarriers for received OFDM data to provide frequency responses of the channels of the subcarriers;

forming a measure of quality ("channel state information," "CSI") for the channels of the subcarriers based on the relative strength of the frequency responses, the forming of the CSI not requiring estimating the relative amount of noise or interference in each channel;

using the formed CSI in demodulating and decoding received OFDM data;

providing a measure of the received signal strength; and using the measure of received signal strength to modify the formed CSI to produce a modified CSI, wherein using the formed CSI in demodulating and decoding uses the modified CSI in demodulating and decoding.

13. The method as recited in claim 12, wherein using the measure of received signal strength produces a modified CSI such that the modified CSI is the formed CSI when the received signal strength is below a selected threshold, and the modified CSI is a constant for all subcarriers when the received signal strength is above the selected threshold.

14. The method as recited in claim 12, wherein using the measure of received signal strength produces a modified CSI such that the modified CSI is the formed CSI when the received signal strength is below a first selected threshold, and the modified CSI is a constant for all subcarriers when the received signal strength is above a second selected threshold.

15. The method as recited in claim 14, wherein the first and second thresholds are different, and when the received signal strength is between the first and second thresholds, the contribution of the formed CSI to the modified CSI is weighted linearly between a full contribution for a relative signal strength at the first threshold and no contribution for a relative signal strength at the second threshold.

16. An apparatus for determining channel state information (CSI) in a receiver for receiving OFDM data packets, the data packets transmitted as a set of subcarriers, the receiver including:

a receive path to receive and digitize a transmitted OFDM data packet and form a set of subcarriers corresponding to the received data, a channel estimator coupled to the output of the receive path to form an estimate of the channels of the subcarriers to provide the frequency responses of the channels of the subcarriers, the apparatus including:

a CSI processor coupled to the channel estimator to form a measure of quality ("channel state information," "CSI") for the channels of the subcarriers based on the relative strength of the frequency responses the CSI processor not requiring estimating the relative amount of noise or interference in each channel to form the CSI, wherein the receiver further includes:

a demodulating and decoding path to accept, demodulate, and decode the set of subcarriers to form decoded data, the demodulating and decoding path including a CSI input coupled to the CSI processor such that the CSI from the CSI processor is used in demodulating and decoding the set of received subcarriers, wherein the CSI processor uses the relative amplitude of the frequency responses to form the CSI, and wherein the CSI processor further includes:

an accumulator coupled to the output of the receive path to determine a measure of the average amplitude of subcarriers; and an AGC scaler coupled to the channel estimator and to the accumulator to scale the relative amplitudes of the frequency responses according to the average amplitude measure to produce a scaled relative amplitude.

17. The apparatus as recited in claim 16, wherein the receive path includes:

receive electronics to wirelessly receive and digitize a wirelessly transmitted OFDM data packet, the receive electronics having an output outputting a set of received data samples, and a Fourier transformer having an input coupled to the output of the receive electronics, and an output forming the DFT of the set of received data samples, the DFT of the received data samples forming the set of received subcarriers.

18. The apparatus as recited in claim 16, wherein the AGC scaler and the accumulator are coupled via a device storing a lookup table that provides scaling factors for different measures of average amplitude, such that the scaling of the AGC scaler is the result of looking up the lookup table using the average amplitude measure.

19. The apparatus as recited in claim 16, wherein the receive path includes filtering, and wherein the CSI processor further includes:
an inverse filter unit coupled to the output of the channel estimator to reverse the effect of the receive path filtering,
such that the formed CSI varies as the relative amplitudes of the frequency responses corrected for the effect of the receiver filtering.

20. The apparatus as recited in claim 16, wherein the inverse filter unit includes a memory to store data for reversing the effects of the receive path filtering.

21. The apparatus as recited in claim 16, wherein the demodulating and decoding path includes:
a demodulator coupled to the receive path output to demodulate the subcarrier data;
a CSI weight unit coupled to the CSI processor and to the demodulator output to weight the results of demodulating by the CSI; and
a decoder coupled to the CSI weight unit to decode the weighted demodulated data.

22. An apparatus for determining channel state information (CSI) in a receiver for receiving OFDM data packets the data packets transmitted as a set of subcarriers, the receiver including:
a receive path to receive and digitize a transmitted OFDM data packet and form a set of subcarriers corresponding to the received data,
a channel estimator coupled to the output of the receive path to form an estimate of the channels of the subcarriers to provide the frequency responses of the channels of the subcarriers,
the apparatus including:
a CSI processor coupled to the channel estimator to form a measure of quality ("channel state information," "CSI") for the channels of the subcarriers based on the relative strength of the frequency responses, the CSI processor not requiring estimating the relative amount of noise or interference in each channel to form the CSI,
wherein the receiver further includes:
a demodulating and decoding path to accept, demodulate, and decode the set of subcarriers to form decoded data, the demodulating and decoding path including a CSI input coupled to the CSI processor such that the CSI from the CSI processor is used in demodulating and decoding the set of received subcarriers, and
wherein the OFDM data includes pilot subcarriers, and wherein the demodulating and decoding path includes:
a pilot correction unit coupled to the receive path output and using knowledge of the pilot subcarriers for phase/frequency correction, the pilot correction unit further coupled to the CSI processor and using the formed CSI for pilot correction such that influence of received pilot subcarriers is according to the CSI.

23. The apparatus as recited in claim 16, wherein the channel estimator produces channel estimates that are static for a received packet of data, such that the CSI formed by the CSI processor does not vary for a received packet of data.

24. The apparatus as recited in claim 16, wherein the channel estimator updates the channel estimates as more data of a packet is decoded, and wherein the CSI processor updates the CSI measure as the channel estimates are updated such that the formed CSI may vary for different parts of a received packet of data.

25. An apparatus for determining channel state information (CSI) in a receiver for receiving OFDM data packets, the data packets transmitted as a set of subcarriers, the receiver including:
a receive path to receive and digitize a transmitted OFDM data packet and form a set of subcarriers corresponding to the received data,
a channel estimator coupled to the output of the receive path to form an estimate of the channels of the subcarriers to provide the frequency responses of the channels of the subcarriers,
the apparatus including:
a CSI processor coupled to the channel estimator to form a measure of quality ("channel state information," "CSI") for the channels of the subcarriers based on the relative strength of the frequency responses, the CSI processor not requiring estimating the relative amount of noise or interference in each channel to form the CSI,
wherein the receiver further includes:
a demodulating and decoding path to accept, demodulate, and decode the set of subcarriers to form decoded data, the demodulating and decoding path including a CSI input coupled to the CSI processor such that the CSI from the CSI processor is used in demodulating and decoding the set of received subcarriers, and
wherein the CSI processor further includes:
a CSI averager accepting one or more previously formed CSI values to average the formed CSI with one or more previously formed CSI values to produce a time averaged CSI.

26. The apparatus as recited in claim 16, wherein the receiver conforms to one or more OFDM variants of the IEEE 802.11 standard.

27. The apparatus for determining channel state information (CSI) in a receiver for receiving OFDM data packets the data packets transmitted as a set of subcarriers, the receiver including:
a receive path to receive and digitize a transmitted OFDM data packet and form a set of subcarriers corresponding to the received data,
a channel estimator coupled to the output of the receive path to form an estimate of the channels of the subcarriers to provide the frequency responses of the channels of the subcarriers,
the apparatus including:
a CSI processor coupled to the channel estimator to form a measure of quality ("channel state information," "CSI") for the channels of the subcarriers based on the relative strength of the frequency responses, the CSI processor not requiring estimating the relative amount of noise or interference in each channel to form the CSI,
wherein the receiver further includes:
a demodulating and decoding path to accept, demodulate, and decode the set of subcarriers to form decoded data, the demodulating and decoding path including a CSI input coupled to the CSI processor such that the CSI from the CSI processor is used in demodulating and decoding the set of received subcarriers,
wherein the receive path provides an indication of received signal strength, the apparatus further comprising:
a modifying unit between the CSI processor and the demodulating and decoding path, the modifying unit using the measure of received signal strength to produce a modified CSI, and wherein using the formed CSI in demodulating and decoding uses the modified CSI in demodulating and decoding.

28. The apparatus as recited in claim 27 wherein the modifying unit produces a modified CSI such that the modified CSI is the formed CSI when the received signal strength is below a selected threshold, and the modified CSI is a constant for all subcarriers when the received signal strength is above the selected threshold.

29. The apparatus as recited in claim 27, wherein the modifying unit produces a modified CSI such that the modified CSI is the formed CSI when the received signal strength is below a first selected threshold, and the modified CSI is a constant for all subcarriers when the received signal strength is above a second selected threshold.

30. The apparatus as recited in claim 29, wherein the first and second thresholds are different, and when the received signal strength is between the first and second thresholds, the contribution of the formed CSI to the modified CSI is weighted linearly between a full contribution for a relative signal strength at the first threshold and no contribution for a relative signal strength at the second threshold.

31. The apparatus for determining channel state information (CSI) in an OFDM radio receiver, the receiver for receiving packets of OFDM data comprising subcarriers as a result of OFDM data being transmitted, the apparatus comprising:
means for forming an estimate of the channels of the subcarriers for received OFDM data to provide frequency responses of the channels of the subcarriers;
means for forming a measure of quality ("channel state information," "CSI") for the channels of the subcarriers based on the relative strength of the frequency responses, the means for forming the CSI not requiring estimating the relative amount of noise or interference in each channel; and
means for using the formed CSI in demodulating and decoding received OFDM data,
wherein the means for forming the CSI uses the relative amplitude of the frequency responses wherein the means for forming the CSI includes:
means for determining a measure of the average amplitude of the subcarriers; and
means for scaling the relative amplitudes of the frequency responses according to the average amplitude measure to produce a scaled relative amplitude, the means for scaling coupled to the means for determining the average measure.

32. The apparatus for determining channel state information (CSI) in an OFDM radio receiver, the receiver for receiving packets of OFDM data comprising subcarriers as a result of OFDM data being transmitted, the apparatus comprising:
means for forming an estimate of the channels of the subcarriers for received OFDM data to provide frequency responses of the channels of the subcarriers;
means for forming a measure of quality ("channel state information," "CSI") for the channels of the subcarriers based on the relative strength of the frequency responses the means for forming the CSI not requiring estimating the relative amount of noise or interference in each channel; and
means for using the formed CSI in demodulating and decoding received OFDM data,
wherein the means for forming the CSI uses the relative amplitude of the frequency responses wherein the receiver includes filtering, and wherein the means for forming the CSI further includes:
means for reversing the effect of the receiver filtering, such that the formed CSI varies as the relative amplitudes of the frequency responses corrected for the effect of the receiver filtering.

33. The apparatus as recited in claim 31, wherein the means for using the formed CSI in demodulating and decoding includes:
means for weighting the results of demodulating by the CSI prior to decoding the demodulated data.

34. An apparatus for determining channel state information (CSI) in an OFDM radio receiver, the receiver for receiving packets of OFDM data comprising subcarriers as a result of OFDM data being transmitted, the apparatus comprising:
means for forming an estimate of the channels of the subcarriers for received OFDM data to provide frequency responses of the channels of the subcarriers;
means for forming a measure of quality ("channel state information," "CSI") for the channels of the subcarriers based on the relative strength of the frequency responses, the means for forming the CSI not requiring estimating the relative amount of noise or interference in each channel; and
means for using the formed CSI in demodulating and decoding received OFDM data,
wherein the OFDM data includes pilot subcarriers, and wherein the receiver includes pilot correction that uses knowledge of the pilot subcarriers for phase/frequency correction, the apparatus further comprising:
means for using the formed CSI in the pilot correction such that influence of received pilot subcarriers is according to the CSI.

35. The apparatus as recited in claim 31, wherein the means for channel estimating produces channel estimates that are static for a received packet of data, such that the formed CSI does not vary for a received packet of data.

36. The apparatus as recited in claim 31, wherein the means for channel estimating includes means for updating the channel estimates as more data of a packet is decoded, such that the means for forming the CSI updates the CSI measure as the channel estimates are updated.

37. The apparatus as recited in claim 31, wherein the receiver conforms to one or more OFDM variants of the IEEE 802.11 standard.

38. A computer-readable storage medium encoded with one or more code segments that when executed by one or more processors execute a method for determining channel state information (CSI) in an OFDM radio receiver, the receiver for receiving packets of OFDM data comprising subcarriers as a result of OFDM data being transmitted the method comprising the steps of:
forming an estimate of the channels of the subcarriers for received OFDM data to provide frequency responses of the channels of the subcarriers;
forming a measure of quality ("channel state information," "CSI") for the channels of the subcarriers based on the relative strength of the frequency responses the forming of the CSI not requiring estimating the relative amount of noise or interference in each channel; and
using the formed CSI in demodulating and decoding received OFDM data,
wherein the forming of the CSI uses the relative amplitude of the frequency responses and wherein the forming of the CSI includes:
determining a measure of the average amplitude of the subcarriers; and scaling the relative amplitudes of the frequency responses according to the average amplitude measure to produce a scaled relative amplitude.

39. A computer-readable storage medium encoded with one or more code segments that when executed by one or more processors execute a method for determining channel state information (CSI) in an OFDM radio receiver, the receiver for receiving packets of OFDM data comprising subcarriers as a result of OFDM data being transmitted, the method comprising the steps of:

forming an estimate of the channels of the subcarriers for received OFDM data to provide frequency responses of the channels of the subcarriers;

forming a measure of quality ("channel state information," "CSI") for the channels of the subcarriers based on the relative strength of the frequency responses, the forming of the CSI not requiring estimating the relative amount of noise or interference in each channel; and using the formed CSI in demodulating and decoding received OFDM data, wherein the forming of the CSI uses the relative amplitude of the frequency responses, wherein the receiver includes filtering, and wherein the forming of the CSI further includes:

reversing the effect of the receiver filtering, such that the formed CSI varies as the relative amplitudes of the frequency responses corrected for the effect of the receiver filtering.

40. The computer-readable storage medium as recited in claim 38, wherein using the formed CSI in demodulating and decoding includes:

weighting the results of demodulating by the CSI prior to decoding the demodulated data.

41. The computer-readable storage medium as recited in claim 38, wherein the channel estimating produces channel estimates that are static for a received packet of data, such that the formed CSI does not vary for a received packet of data.

42. The computer-readable storage medium as recited in claim 38, wherein the channel estimating includes updating the channel estimates as more data of a packet is decoded, the method further including:

updating the CSI measure as the channel estimates are updated, such that the formed CSI may vary for different parts of a received packet of data.

43. The computer-readable storage medium as recited in claim 38, wherein the receiver conforms to one or more OFDM variants of the IEEE 802.11 standard.

* * * * *

UNITED STATES PATENT AND TRADEMARK OFFICE
CERTIFICATE OF CORRECTION

| | |
|---|---|
| PATENT NO. | : 7,359,311 B1 |
| APPLICATION NO. | : 10/418694 |
| DATED | : April 15, 2008 |
| INVENTOR(S) | : Paranjpe et al. |

It is certified that error appears in the above-identified patent and that said Letters Patent is hereby corrected as shown below:

In column 19, line 10, kindly replace "The apparatus as recited in claim 16" with --The apparatus as recited in claim 19--

Signed and Sealed this

Seventh Day of October, 2008

JON W. DUDAS
*Director of the United States Patent and Trademark Office*